United States Patent [19]
Weberg

[11] 4,318,514
[45] Mar. 9, 1982

[54] NETTING APPLICATOR

[76] Inventor: Wallace Weberg, R.R. #2, Welch, Minn. 55089

[21] Appl. No.: 123,998

[22] Filed: Feb. 25, 1980

[51] Int. Cl.[3] ............................................. B65H 75/40
[52] U.S. Cl. ................................. 242/86.52; 47/28 R; 242/68.4
[58] Field of Search .......... 242/86.52, 86.5 R, 129.51, 242/68, 68.4; 47/26, 28 R, 28 A, 31, 20, 9, 29, 30, 32, 22

[56] References Cited

U.S. PATENT DOCUMENTS

| | | |
|---|---|---|
| 987,593 | 3/1911 | O'Malley . |
| 1,550,082 | 8/1925 | Lintz et al. . |
| 1,562,353 | 11/1925 | McGuire et al. . |
| 2,078,872 | 4/1937 | Pfeiffer . |
| 2,592,437 | 4/1952 | La Pedus . |
| 2,740,233 | 4/1956 | Reynolds . |
| 2,869,284 | 1/1959 | Abernaty et al. . |
| 3,181,455 | 5/1965 | Gouker et al. . |
| 3,184,889 | 5/1965 | Gray et al. . |
| 3,395,485 | 8/1968 | Rooklidge ..................... 242/86.52 X |
| 3,473,755 | 10/1969 | Brown .............................. 242/86.52 |
| 3,581,436 | 6/1971 | Basiger ..................................... 47/26 |
| 3,598,332 | 8/1971 | Sharkey ............................. 242/68 X |
| 3,661,481 | 5/1972 | Haviland, Jr. et al. ............ 47/26 X |
| 3,701,241 | 10/1972 | Zuckerman .......................... 47/26 X |

FOREIGN PATENT DOCUMENTS 684115 12/1952 United Kingdom ........... 242/129.51

*Primary Examiner*—John M. Jillions
*Attorney, Agent, or Firm*—Norman P. Friederichs

[57] ABSTRACT

A machine for applying and retracting a protective covering to agricultural plants is disclosed. The implement (10) is supportively attached by forward and rearward attachment mechanisms (12, 14) to a tractor (16) and movably supported additionally by a coaster wheel (18) laterally spaced from the tractor (16). Vertically-oriented supports and rearward attachment mechanisms (12, 14) and front attachment to wheel (18) to support a horizontally-oriented, substantially-rectangular frame (26). A rotatable shaft mechanism (28) attached to a universal joint (108) is supported at the ends by shaft supports (30, 32) which extend upwardly from the rearward portion of the frame (26). A shaft mechanism (28) is driven by a hydraulic motor (34) which receives controllable power from tractor (16).

20 Claims, 4 Drawing Figures

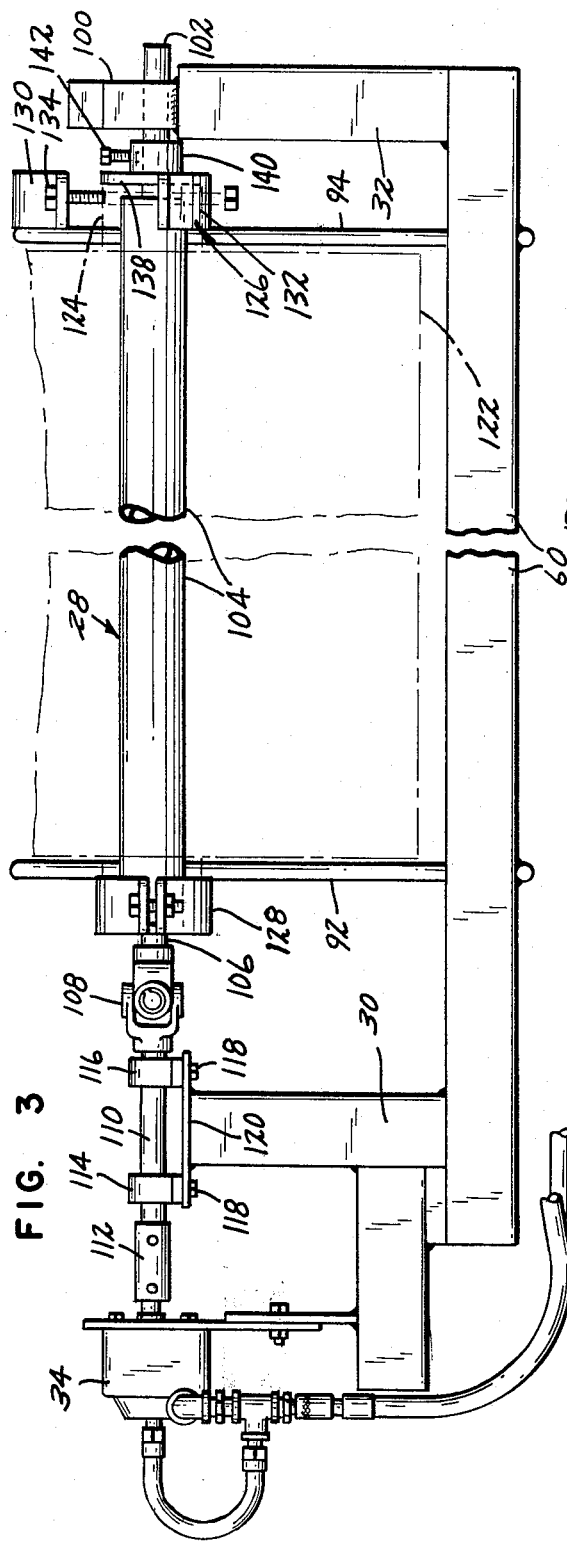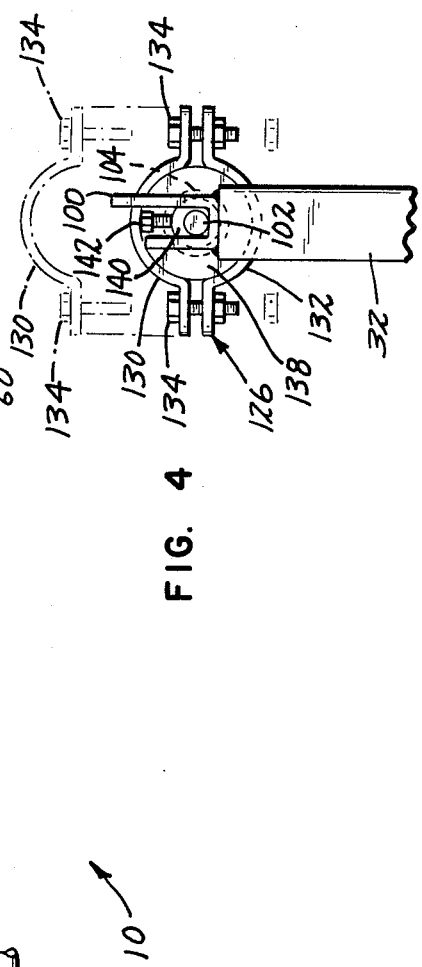

NETTING APPLICATOR

FIELD OF THE INVENTION

This invention relates to an agricultural implement and, more particularly, to an apparatus for laying protective netting onto agricultural plants to protect the plants from predators. The apparatus is also suitable for retracting the netting from the plants.

BACKGROUND OF THE INVENTION

Machines for applying protective covers to various surfaces have been known for some time. Many of these machines have been designed for specific applications, such as depositing and lifting a cover for a baseball field or laying a blanket on newly laid concrete. Others of these machines have been used in agriculture for laying a covering on the ground or protecting certain types of agricultural plants. Generally, these machines are used in conjunction with a tractor and include a frame mounted on wheels which supports a rotatable shaft having a roll of the covering material mounted thereon. Some of the machines include mechanisms which form the protective covering into a specified shape, such as a hat-shaped cross section. One device, shown in U.S. Pat. No. 3,395,485, is used to apply a plastic sheet material over fruit trees. The device is supported from a tractor and includes a pivotable vertical post to which a horizontal, rotatable shaft mechanism is attached. The horizontal shaft is located at a height sufficient to clear any tree which is to be covered. As the tractor moves along between two rows of fruit trees, a motor operates to turn the horizontal shaft and dispense the protective covering over the trees. At the end of a row a cutting wheel mechanism operates to cut the material.

One problem with known machines used to apply protective covers to agricultural plants is that such machines do not have the capability of retracting the cover after its use is no longer required.

SUMMARY OF THE INVENTION

The present invention is a netting applicator having an upper frame, a plurality of supports attached to and supporting the frame, and mechanism for removably securing the supports to a self-propelled vehicle. The applicator may also include a wheel and mechanism for attaching the wheel to one of the supports to supplement the movable support provided by the vehicle. The applicator has a rotatable shaft including mechanism for locking a roll core with net thereon onto the shaft, support means adjacent both ends of the shaft for supporting the shaft with respect to the frame with one of the support means being releasable, means for pivoting the shaft relative to the nonreleasable shaft support means to aid in mounting and dismounting the roll core, and power means for rotatably driving the shaft.

In a preferred embodiment, three supports rise vertically to hold a horizontally-oriented frame at a height which will easily clear all types of agricultural plants for which the implement may be used, for example grapevines. Two of the supports are detachably securable at their lower end to the forward and rearward ends of a vehicle such as a tractor. A third support is attached at its lower end to a coaster wheel. The wheel is spaced laterally from the tractor at a distance which allows it to avoid a row of agricultural plants. A rotatable shaft is supported above the rear portion of the frame. The shaft has an axis which in normal use is perpendicular to the direction traversed by the tractor. One end of the shaft is detachable from its supports while attached to the other end is a universal joint which allows the shaft to be pivoted downward for easy mounting and dismounting of a roll of netting. A cradling arm and ladders are provided as an additional aid to mounting and dismounting net rolls.

The mechanism for attaching the implement to the tractor provide for slight rotation along an axis parallel to the path of the tractor to allow the implement to move slightly relative to the tractor when the lateral wheel rises or falls as it moves along the ground, thereby preventing structural stress to the implement.

To operate the invention, the shaft is pivoted downward at the universal joint. A roll of netting is inserted onto the shaft, clamped in place, and lifted to a resting position on a cradling arm. From the cradling arm, the netting is lifted so as to place the shaft in its supported operational position. With the tractor and the lateral wheel both oriented to pass between the rows of agricultural plants, the hydraulic motor is started in order to rotate the shaft and dispense netting rearward as the tractor travels forward.

To retract netting, the tractor and coaster wheel are oriented relative to the plant rows as previously indicated, and the netting at one end of a protected row is raised vertically over a front, lateral member of the frame before passing horizontally rearward to the core mounted on the rotatable shaft. As the tractor moves forward, netting continues to be lifted vertically from the plants and wound about the shaft. The shaft is driven by the hydraulic motor at a speed which allows efficient retraction of the netting relative to the forward speed of the tractor.

Although any type of protective covering which can be wound on a shaft could be dispensed onto agricultural plants by using this invention, it is perhaps best suited to apply a netting material over grapevines in order to prevent birds and other predators from destroying a grape crop. The implement may be used to retract the netting immediately before harvesting.

One feature which makes the implement especially useful in a vineyard is a forward lateral frame member which is functionally used to lift netting vertically during the retracting operation in order to prevent the netting from being caught on or dragged along the grapevines.

It is additionally advantageous that the rotatable shaft has one releasable end and a second end attached to a universal joint. This arrangement allows the shaft to pivot downward to aid in easy mounting and dismounting of very heavy netting rolls. Attached ladders and cradling arms are advantageously provided on which to rest the netting roll for use during mounting or dismounting of such roll.

Another significant feature of the invention is the capability of the attachment mechanisms at the forward and rearward ends of the tractor to permit slight rotational movement of the applicator in a direction parallel to the path of the tractor, thus minimizing or eliminating structural stress to the implement.

For a still better understanding of the invention, its advantages, and objects attained by its use, reference should be had to the drawings which form a further part hereof, and to the accompanying descriptive matter, in which there are illustrated and described embodiments of the invention.

BRIEF DESCRIPTION OF THE DRAWINGS

FIG. 3 is an enlarged rear elevational view of the rotatable shaft and its support structure; and FIG. 4 is an end view of a clamp which attaches the roll of netting to the rotatable shaft.

DESCRIPTION OF A PREFERRED EMBODIMENT

Figure 1:
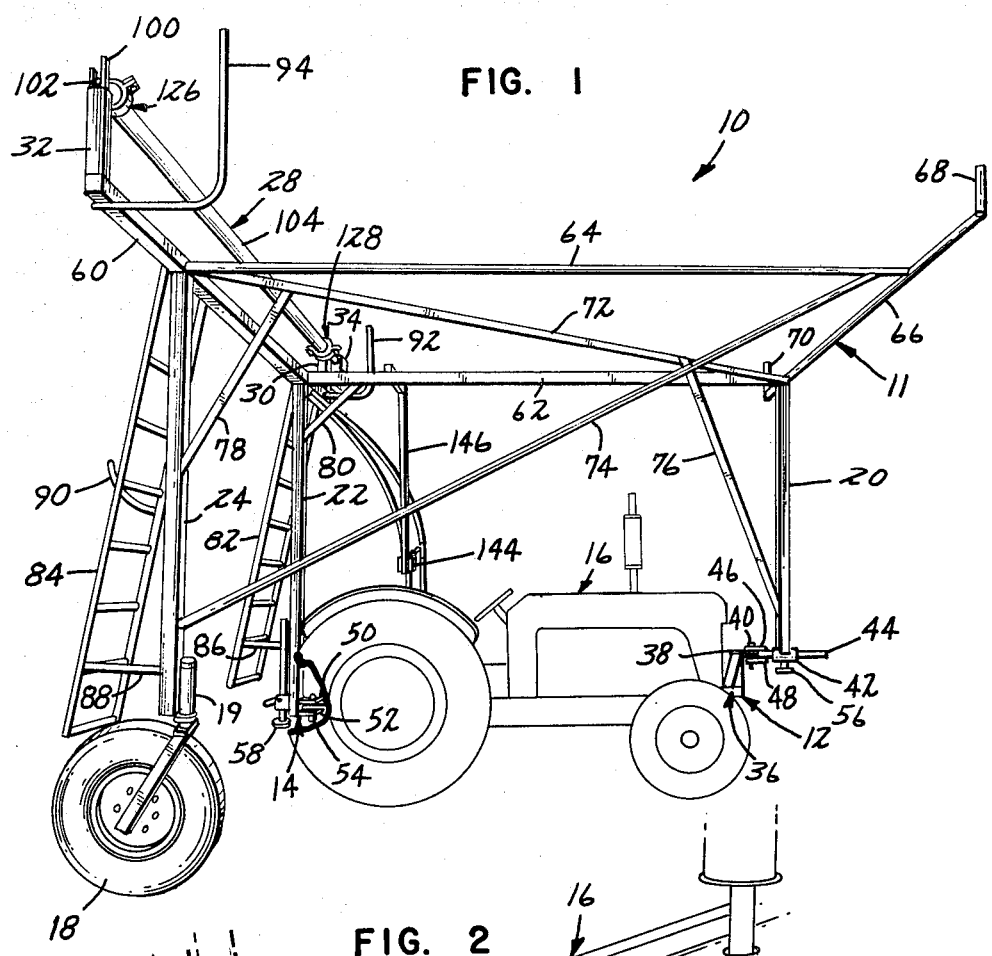
FIG. 1 is a perspective view of the invention.

One preferred embodiment of the present applicator is disclosed in FIGS. 1-4. In the drawings like reference numerals designate identical or corresponding parts throughout the several views.

The implement 10 may have structural elements including an upper frame 11 and a plurality of vertical supports 20, 22 and 24. A pair of the vertical supports 20 and 22 may be secured to the tractor 16 by forward attachment mechanism 12 and rearward attachment mechanism 14, respectively. A third support may ride on a caster wheel 18, the support 24 and wheel 18 being laterally spaced from tractor 16. Vertically-oriented supports 20, 22 and 24 rise from the forward and rearward attachment mechanisms 12 and 14 and from attachment with caster wheel 18, respectively, to support the horizontally-oriented, substantially-rectangular frame 11. The netting applicator 10 has a rotatable shaft mechanism 28 which is supported at each end by shaft support 30, 32, respectively. The supports 30 and 32 are mounted on the rearward portion of frame 11. Shaft mechanism 28 has a universal joint 108 for purposes hereinafter set forth. Shaft mechanism 28 is driven by an hydraulic motor 34 (see FIG. 3) which receives controllable power from tractor 16.

Vertical supports 20, 22 and 24 may be of square tubular stock having a length which extends vertically from the lower attachment points to the frame 11. The frame 11 may be located a sufficient height above the ground to clear any agricultural plants over which implement 10 may be used to spread a protective covering.

Figure 2:
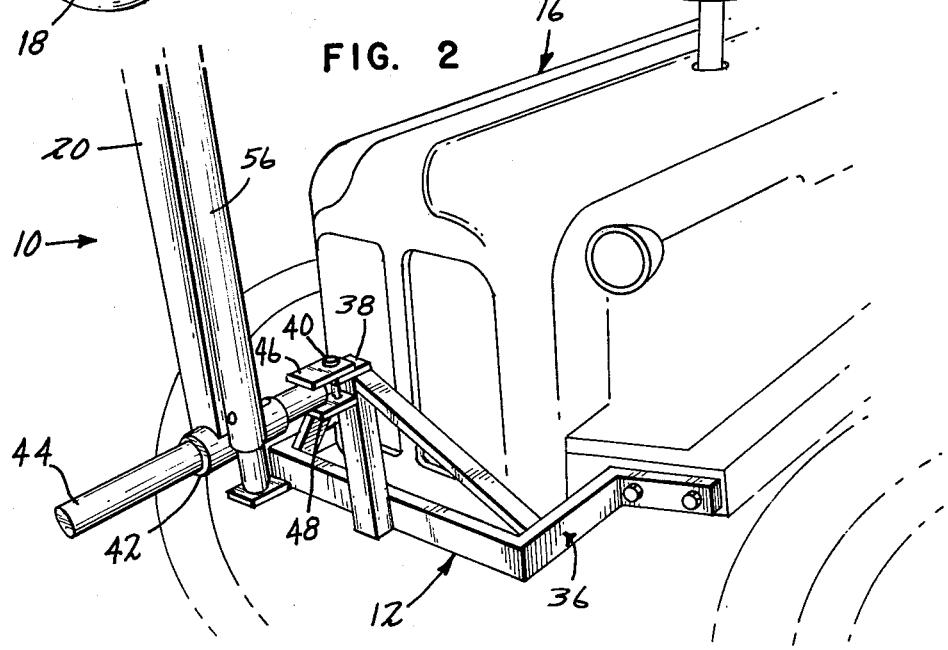
FIG. 2 is a perspective view of the forward implement attachment to the tractor.

As shown in FIG. 2, the forward attachment mechanism 12 includes a hitch adapter 36 between tractor 16 and implement 10. Adapter 36 is bolted to tractor 16 and includes structure which fixedly holds a horizontally-oriented plate 38 having an opening for insertion of a hitch pin 40 to connect implement 10 to plate 38 as hereinafter described. Forward attachment mechanism 12 further includes a circular tube 42 attached to the bottom end of support 20. The axis of tube 42 is perpendicular to vertical support 20 and parallel to the path of tractor 16. Tube 42 rotatably encases a cylinder 44 having a diameter slightly smaller than the inside diameter of tube 42 and a length somewhat greater than tube 42. Identical rectangular plates 46, 48 are attached at upper and lower points to the rearward end portion of cylinder 44 such as by welding. Plates 46, 48 extend beyond the rearward end of cylinder 44 and have openings corresponding to the opening in plate 38 which allow hitch pin 40 to pass therethrough in order to detachably connect implement 10 to tractor 16 near its forward end.

Rear attachment mechanism 14 is comprised of a hitch-like structure including horizontally-oriented, spaced-apart rectangular plates 50, 52 attached near the lower end portion and extending forwardly from vertical support 22. Both plates 50, 52 have openings corresponding to an axially-vertical opening in a rear hitch of tractor 16 for detachable attachment of implement 10 by the passage of hitch pin 54 therethrough.

Jack mechanisms 56, 58 are attached to the lower portions of supports 20, 22, respectively, for use in supporting implement 10 when it is not attached to tractor 16. Jack mechanisms 56, 58 may be ratchet structure or a screw structure. Caster wheel 18 is attached to the lower portion of support 24 by welding or otherwise attaching standard caster wheel bracket 19 to support 24.

Frame 11 is supported by vertical supports 20, 22, 24. Frame 11 is generally rectangular having a lateral, rearward member 60 which is attached to the upper ends of supports 22 and 24 and may extend laterally beyond both supports 22 and 24. Longitudinal member 62 is attached to lateral member 60 to make a right angle with support 22 and extends forwardly to attachment with support 20 at the upper end of support 20. Longitudinal member 64 runs parallel to longitudinal member 62 and is attached to lateral member 60 at a right angle with respect to support 24. Lateral member 66 runs parallel to lateral member 60 and is attached to the forward ends of longitudinal members 62 and 64 and may extend laterally beyond both longitudinal members 62 and 64. Guides 68, 70 extend vertically from the ends of lateral member 66. Guides 68, 70 assure alignment of the netting with the core on shaft mechanism 28 and prevent netting from falling off the ends of lateral member 66 during a netting retraction operation. During retraction netting is pulled upward from grapevines or other agricultural plants over lateral member 66 and rearward to wrap around the core which is secured to rotatable shaft mechanism 28.

Diagonal brace member 72 extends from the intersection of lateral member 60 and longitudinal member 64 to the intersection of lateral member 66 and longitudinal member 62. Brace 74 is attached to and rises upwardly from the lower portion of support 24 to the forward portion of longitudinal member 64. Brace 76 is attached to and rises upwardly from the lower portion of support 20 to the generally forward portion of diagonal member 72. Brace 78 is attached to and rises upwardly from approximately the middle of support 24 to the generally rearward portion of diagonal member 72. Brace 80 forms the hypotenuse of an isosceles triangle with support 22 and longitudinal member 62, being attached to the upper portion of support 22 and the rearward portion of longitudinal member 62. Lateral member 60, longitudinal member 62 and diagonal member 72 may be tubes of square cross section similar to supports 20, 22 and 24. Longitudinal member 64, lateral member 66, guides 68 and 70, and brace 74 may, for example, be circular in cross section having an outer diameter somewhat smaller than cross sectional dimensions of the square tube members. Braces 76, 78 and 80 may be of angle iron.

Ladders 82, 84 are attached at their upper end to lateral member 60 in the vicinity of supports 22 and 24, respectively. Brace 86 is attached to the lower portion of ladder 82 and the lower portion of support 22 supporting the lower portion of ladder 82 rearwardly away from support 22. Similarly, brace 88 is attached to the lower portion of ladder 84 and the lower portion of support 24 supporting the lower portion of ladder 84 rearwardly from support 24. An arcuately-shaped arm 90 of sufficient length to cradle a roll of netting is attached to ladder 84 approximately at its vertical midpoint. Arm 90 may be of circular stock.

Identical net containment arms 92, 94 are attached at the bottom of lateral member 60 at a location spaced laterally from longitudinal member 62 and longitudinal member 64, respectively. Arms 92 and 94 extend forwardly from longitudinal member 60 to a point generally forward of the forwardmost circumferential point on a roll of netting and upwardly beyond the point where the arm would tangentially touch the forwardmost point of a roll of netting.

Shaft supports 30, 32 (FIG. 3) extend vertically from the end portions of lateral frame member 60 to support shaft mechanism 28. A U-shaped channel member 100 is attached to the top end of support 32 for rotatable confinement of trunnion 102. Trunnion 102 is attached to the end of round tube 104. A second trunnion 106 is attached to the other end of tube 104. One end of universal joint 108 is attached to an end of trunnion 106. The second end of universal joint 108 is attached to one end of a shaft 110. The other end of shaft 110 is coupled to hydraulic motor 34 such as by coupler 112. Shaft 110 may be rotatably supported in bearings 114, 116. Bearings 114 and 116 are attached with bolts 118 to a rectangular plate 120 mounted on the upper end of support 30.

One end of shaft mechanism 28 may be lifted from U-shaped channel 100 and lowered to cradling arm 90 for mounting or dismounting of a roll of netting. The shaft mechanism 28 pivots at universal joint 108. As shown in phantom lines in FIG. 3, roll core 124 with netting 122 wrapped thereon encircles and is clamped, as hereinafter described, at its ends to tube 104.

Clamping mechanisms 126 and 128 may be similar in construction and may be mounted at opposite ends of tube 104. Clamping mechanism 126, for example, may include upper and lower plates 130, 132 having flat end portions with a semicircular portion therebetween, as shown in FIG. 4. The inside diameter of the semicircular portion of plates 130 and 132 is equivalent to the outer diameter of roll core 124. The central portions of plates 130 and 132 are less than complete semicircles. Bolts 134 pass through corresponding openings in the flat end portions of plates 130 and 132. Bolts 134, when tightened with nuts 136, clamp plates 130 and 132 around roll core 124. A circular plate 138 carrying a hub 140 is attached to the circular portion of plate 130 or 132. The hub 140 may have a set screw 142 which locks the clamping mechanism 126 to the shaft 28.

If desired, clamping mechanism 128 may be permanently fixed to shaft 28 while clamping mechanism 126 may be removably attached thereto.

As shown in FIGS. 1 and 3, hydraulic motor 34 drives shaft mechanism 28. Motor control 144 is positioned within easy reach of the tractor operator by attachment to a drop member 146 extending downwardly from member 62. In the present invention the net applicator may be driven by a conventional hydraulic pump commonly provided on farm tractors.

In operation, net applicator implement 10 is taken from storage and attached to tractor 16. While being stored, implement 10 rests on jacks 56, 58 and wheel 18. Tractor 16 is maneuvered between supports 20 and 22. Forward and rearward attachment mechanisms 12 and 14 are secured to tractor 16. Hydraulic hoses are appropriately attached.

Implement 10 is loaded with a roll of netting by first lifting shaft mechanism 28 from U-shaped channel 100 and pivoting it downward about universal joint 108.

With clamping mechanism 126 removed from trunnion 102, a roll of netting is inserted onto tube 104. Shaft mechanism 28 is then lifted to a rest position on cradling arm 90. The roll core 124 with netting 122 wrapped thereon is fastened securely to tube 104 by clamping mechanisms 126 and 128. Shaft mechanism 28 is then lifted into its operable position by again placing trunnion 102 within U-shaped channel 100.

Assuming grapevines are the agricultural plants to be protected, tractor 16 and implement 10 are aligned relative to a row of grapevines such that the tractor 16 passes to the left of a row and caster wheel 18 passes to the right. Control 144 is set to start hydraulic motor 34 in operation so that shaft mechanism 28 begins rotating and dispensing netting. Tractor 16 is driven forwardly as the netting begins to drape onto the gravevines. At the end of a row the netting is manually cut, and tractor 16 and implement 10 are aligned for net distribution onto another row. This is continued until all desired rows are covered.

To retract the netting, tractor 16 and implement 10 are aligned relative to a row of grapevines in an orientation similar to the net distribution procedure. Tractor 16 is driven forwardly sufficiently to allow the netting to be lifted upwardly over lateral frame member 66 and rearwardly to attachment with roll core 124 clamped with clamping mechanisms 126 and 128 onto tube 104. Control 144 is set to start hydraulic motor 34 and rotate shaft mechanism 28. As tractor 16 with attached implement 10 moves forwardly, netting is lifted substantially vertically from the grapevines and pulled up between guides 68 and 70 over lateral frame member 66 and wrapped onto roll core 124.

When netting retraction has been completed, roll core 124 with netting 122 wrapped thereon is dismounted and removed from shaft mechanism 28 by reversing the mounting and installation steps previously described. Tractor 16 is detached from implement 10 by disconnecting as appropriate the hydraulic system, elevating jacks 56 and 58 to a height where the weight of implement 10 just rests on jacks 56 and 58 rather than on tractor 16 and removing hitch pins 40 and 54.

Numerous characteristics and advantages of the invention have been set forth in the foregoing description, together with details of the structure and function of the invention. The disclosure, however, is illustrative only, and it is therefore to be understood that changes may be made in detail, especially in matters of shape, size and arrangement, within the principle of the invention, to the full extent intended by the general meaning of the terms in which the appended claims are expressed.

What is claimed is:

1. A net applicator apparatus for attachment to a self-propelled vehicle, said apparatus being adapted for laying a net onto agricultural plants to protect said plants from predators and for retracting said net from said plants, said net applicator apparatus comprising a frame, a plurality of supports attached to and supporting said frame, means for removably securing plurality of said supports to said vehicle, a wheel and means for attaching said wheel to one of said supports to supplement the movable support provided for said apparatus by said vehicle, a rotatable shaft having first and second ends and including means for locking a roll core with net thereon onto said shaft, said roll core locking means including a removable first means for clamping said roll core to said shaft, said first clamp means being attached to the first end of said shaft, and a second clamp means for clamping said roll core to said shaft, said second clamp means being attached to the second end of said shaft, first support means adjacent the first end of said shaft for releasably supporting said shaft with respect to said frame, second support means adjacent the second end of said shaft for supporting said shaft with respect to said frame, means for pivoting said shaft relative to said second support means to aid in mounting and dismounting said roll core, said pivot means being attached to the second end of said shaft, and power means for rotatably driving said shaft, said first support means including a U-shaped channel atop a support member for rotatable confinement of said shaft, said shaft being removed from said U-shaped channel by vertically raising said shaft, and said pivoting means including a universal joint, whereby to mount or dismount said roll core, the first end of said shaft may be lifted from said U-channel to pivot said shaft downwardly at said universal joint and said first clamp means being removable allowing removal or installation of said roll core.

2. A net applicator apparatus in accordance with claim 2 further comprising a ladder located approximately beneath said shaft and connected to one of said supports and further comprising a cradling arm attached to said ladder whereby said shaft loaded with a roll core with net thereon may be rested while preparing to hoist said shaft to an operable position atop said first support means.

3. A net applicator apparatus in accordance with claim 2 further comprising a plurality of cradling members attached to said frame for supporting said net on said operably-positioned shaft.

4. A net applicator apparatus in accordance with claim 3 wherein said power means includes an hydraulic motor.

5. A net applicator apparatus in accordance with claim 4 wherein said securing means includes means for attaching said apparatus to a forward point on said vehicle and means for attaching said apparatus to a rearward point on said vehicle, both said attaching means allowing rotatable movement of said apparatus about an axis parallel to the path of said vehicle whereby structural stress to said apparatus is avoided when said apparatus tilts with respect to said vehicle.

6. A net applicator apparatus in accordance with claim 5 wherein said forward attaching means includes a shaft substantially aligned with the path of said vehicle and releaseably attached to said vehicle and further includes a tube attached to one of said supports and enveloped about said shaft, said tube having an inside diameter slightly larger than said shaft, whereby said apparatus may pivot with respect to said vehicle as said tube rotates with respect to said shaft.

7. A net applicator apparatus in accordance with claim 6 wherein said wheel is a coaster wheel, whereby said wheel may rotate about a substantially horizontal axis allowing said wheel to track along the direction traversed by the tractor.

8. A net applicator apparatus for laying a net onto agricultural plants to protect said plants from predators and for retracting said net from said plants, said apparatus comprising:
 a self-propelled vehicle;
 a net handling frame for said apparatus including means for lifting said net substantially vertically from said plants and guiding said net while retracting same;
 means at least partially attached to said vehicle for supporting said frame, said attachment means including first mechanisms for attachment to the front of said vehicle and second mechanisms for attachment to the rear of said vehicle;
 a rotatable shaft having first and second ends and including means for locking a roll core with net thereon onto said shaft;
 first support means adjacent the first end of said shaft for releasably supporting said shaft with respect to said frame;
 second support means adjacent the second end of said shaft for supporting said shaft with respect to said frame;
 means for pivoting said shaft relative to said second support means to aid in mounting and dismounting said roll core, said pivot means attached to the second end of said shaft; and
 power means for rotatably driving said shaft.

9. A net applicator apparatus for laying a net onto agricultural plants to protect said plants from predators and for retracting said net from said plants, said apparatus comprising a self-propelled vehicle; a frame for said apparatus including means for lifting said net substantially vertically from said plants and guiding said net while retracting same; means at least partially attached to said vehicle for supporting said frame; said frame being comprised of four structural members attached in a substantially rectangular arrangement, said frame having a forward member and a rearward member, said forward and rearward members extending laterally with respect to said vehicle, and said lifting and guiding means including said forward member located forward of said shaft, said forward member having guideposts rising from either end thereof and attached to said forward member; a rotatable shaft having first and second ends and including means for locking a roll core with net thereon onto said shaft; first support means adjacent the first end of said shaft for releasably supporting said shaft with respect to said frame; second support means adjacent the second end of said shaft for supporting said shaft with respect to said frame; means for pivoting said shaft relative to said second support means to aid in mounting and dismounting said roll core, said pivot means attached to the second end of said shaft; and power means for rotatably driving said shaft; whereby during a retracting operation as said power drives said shaft, said net is lifted substantially vertically by said forward member, passing over said forward member while being guided between said guideposts, and pulled rearward for winding around said roll core on said shaft.

10. A net applicator apparatus in accordance with claim 9 wherein said frame support means includes a plurality of supports attached to said frame and means for attaching a first support to a forward point on said vehicle, means for attaching a second support to a rearward point on said vehicle, a wheel, and means for attaching a third support to said wheel, said wheel being laterally spaced apart from said rearward attaching means, whereby said apparatus is movably supported by said vehicle and said wheel.

11. A net applicator apparatus in accordance with claim 10 wherein said forward attaching means and said rearward attaching means are at least partially rotatable about an axis parallel to the path of said vehicle whereby structural stress on said apparatus is avoided when said apparatus tilts with respect to said vehicle by allowing said apparatus to rotate with respect to said vehicle at said forward and rearward attaching means.

12. A net applicator apparatus for laying a net onto agricultural plants to protect said plants from predators and for retracting said net from said plants, said apparatus comprising:
- a self-propelled vehicle with forward and rearward attaching means;
- a frame;
- three substantially vertically-upright supports attached to and supporting said frame, a first and second of said supports being attached to said vehicle by said forward and rearward vehicle attaching means, respectively;
- a wheel and means for attaching said wheel to a third of said supports to supplement the movable support provided for said apparatus by said vehicle;
- a roll core for wrapping net thereon;
- a rotatable shaft having first and second ends and including means for locking said roll core onto said shaft;
- first support means adjacent the first end of said shaft for releasably supporting said shaft with respect to said frame;
- second support means adjacent the second end of said shaft for supporting said shaft with respect to said frame;
- means for pivoting said shaft relative to said second support means to aid in mounting and dismounting said roll core, said pivot means attached to the second end of said shaft; and
- power means for rotatably driving said shaft.

13. A net applicator apparatus in accordance with claim 12 wherein said forward and rearward vehicle attaching means include a first plate connected to and extending from said vehicle and second and third plates connected to said first and second supports, said second and third plates being spaced-apart and oriented parallel to said first plate to allow said first plate to fit between said second and third plates, each of said plates having an opening for insertion of a pin to releasably hold said apparatus with respect to said vehicle, and said apparatus further comprising jack means for supporting said apparatus when said apparatus is not attached to said vehicle, said jack means being attached to said first and second supports.

14. A net applicator apparatus in accordance with claims 11 and 13 wherein said forward attaching means includes a cylinder approximately aligned with the path of said vehicle, said cylinder being releaseably attached to said vehicle, said forward attaching means further including a tube attached to one of said supports and enveloped about said cylinder, said tube having an inside diameter slightly larger than the diameter of said cylinder, whereby said apparatus may pivot with respect to said vehicle as said tube slightly rotates with respect to said cylinder.

15. A net applicator apparatus in accordance with claim 14 wherein said wheel is a coaster wheel, whereby said wheel may rotate about a substantially vertical axis allowing said wheel to track parallel to the path of said vehicle.

16. A net applicator apparatus in accordance with claim 15 wherein said roll core locking means includes a removable first means for clamping said roll core to said shaft, said first clamping means being releasably locked with respect to the first end of said shaft, and a second means, said second means being locked with respect to the second end of said shaft; for clamping said roll core to said shaft; wherein said first support means includes for rotatable confinement of said shaft a U-shaped channel atop a support member, said shaft being removed from said U-shaped channel by vertically raising said shaft; and wherein said pivoting means includes a universal joint; whereby to mount or dismount said roll core, the first end of said shaft may be lifted from said U-shaped channel to pivot said shaft downwardly at said universal joint and remove said first clamping means allowing removal or installation of said roll core.

17. A net applicator apparatus in accordance with claim 16 further comprising a ladder located approximately beneath said shaft and connected to one of said supports and further comprising a cradling arm attached to said ladder whereby said shaft loaded with a roll core with net thereon may be rested while preparing to hoist said shaft to an operable position atop said first support means.

18. A net applicator apparatus in accordance with claim 17 further comprising a plurality of cradling members attached to said frame for supporting said net on said operably-positioned shaft.

19. A net applicator apparatus in accordance with claim 18 wherein said power means includes an hydraulic motor connected for receiving energy from said self-propelled vehicle, the speed of said hydraulic motor being controllable by an operator of said vehicle.

20. A net applicator apparatus for laying a net onto agricultural plants to protect said plants from predators and for retracting said net from said plants, said net applicator apparatus comprising:
- a self-propelled vehicle with forward and rearward attaching means;
- a frame including longitudinal members and forward and rearward lateral members connected together in a substantially rectangular pattern, the forward frame lateral member having a guidepost rising from both its ends, said guideposts guiding the net while retracting the net from said plants;
- three substantially vertically-upright supports attached to and supporting said frame, a first and second of said supports having means for connecting to said forward and rearward vehicle attaching means, said connecting means allowing said apparatus to pivot slightly as said apparatus tilts with respect to said vehicle;
- a coaster wheel spaced laterally apart from said vehicle, said wheel attached to a third of said supports to supplement the movable support provided for said apparatus by said vehicle;
- a rotatable shaft having first and second ends and including a removable first means for clamping a roll core with net thereon to said shaft, said first clamping means being releasably locked with respect to the first end of said shaft, said rotatable shaft including also a second means for clamping a roll core with net thereon to said shaft, said second clamping means being locked with respect to the second end of said shaft;
- a first shaft support member rising from attachment with a first end of said rearward lateral frame member and including atop said first shaft support member a U-shaped channel for rotatable and releasable confinement of said shaft;
- a second shaft support member rising from attachment with a second end of said rearward lateral frame member and including means for rotatable confinement of one end of a universal joint member, a second end of said universal joint member being attached to the second end of said shaft, said universal joint member for allowing said shaft to pivot downward after removal of said shaft from the U-shaped channel atop said first shaft support member to aid in mounting and dismounting the roll core with net thereon; and means for rotatably driving said shaft, said driving means including a motor.

* * * * *

UNITED STATES PATENT AND TRADEMARK OFFICE
CERTIFICATE OF CORRECTION

PATENT NO. : 4,318,514
DATED : March 9, 1982
INVENTOR(S) : Wallace Weberg

It is certified that error appears in the above—identified patent and that said Letters Patent is hereby corrected as shown below:

Column 7, Claim 2, line 22, delete "2" insert -- 1 --.

Signed and Sealed this

Fourteenth Day of December 1982

[SEAL]

Attest:

Attesting Officer

GERALD J. MOSSINGHOFF

Commissioner of Patents and Trademarks